United States Patent Office 2,960,487
Patented Nov. 15, 1960

2,960,487

RUBBER STABILIZED WITH N-SEC-ALKYL-P-AMINOPHENOLS

Robert H. Rosenwald, Western Springs, and Joseph A. Chenicek, Bensenville, Ill., assignors, by mesne assignments, to Universal Oil Products Company, Des Plaines, Ill., a corporation of Delaware No Drawing. Filed Oct. 9, 1957, Ser. No. 689,029

8 Claims. (Cl. 260—45.9)

This is a continuation-in-part of our copending application Serial No. 401,430 filed December 30, 1953, now abandoned, and relates to the stabilization of rubber and more particularly to a novel method of retarding the cracking of rubber due to ozone.

It is only comparatively recently that the cracking of rubber has been recognized as being caused by ozone. This recognition resulted particularly as a result of the military being unable to use in the Korean war vehicles which were stored after World War II because of deterioration of the rubber tires and other rubber products. As a result of this, an intensive investigation was conducted and the deterioration of the rubber materials was found to be due to ozone. Deterioration of rubber by ozone is a surface reaction and results in cracking of the rubber. On the other hand, deterioration of rubber due to oxidative deterioration results primarily in stiffening of the rubber and loss of elasticity. Therefore, the deterioration due to ozone is different from the deterioration due to oxygen, not only in the type of deterioration products but also in the mechanism of deterioration. Furthermore, protection from ozone requires the use of considerably larger concentrations of additive than is required to retard oxidative deterioration. Most antioxidants either are ineffective as antiozonants or promote oxidation in the large concentrations required for antiozonation purposes.

The stabilization of rubber presents problems which are different from those encountered with other substrates as, for example, hydrocarbon distillates. First, the additive must not be too toxic or possess sensitivity properties which will prove harmful when used in rubber which contacts food products or which will prove to be a hazard when handled by men working with the rubber products. In addition to possessing high potency to retard ozone cracking, a satisfactory additive must possess the desired fugacity so that it will not be lost during compounding or in use at high temperatures.

In one embodiment the present invention relates to a method of stabilizing rubber subject to cracking due to ozone which comprises incorporating in said rubber an N-sec-alkyl-p-aminophenol antiozonant in which the sec-alkyl group contains from 7 to 12 carbon atoms.

In a specific embodiment the present invention relates to a method of preventing the cracking of synthetic rubber due to ozone which comprises incorporating in said rubber from about 0.25% to about 10% by weight of N-sec-octyl-p-aminophenol.

In still another embodiment the present invention relates to rubber stabilized against cracking due to ozone containing an antiozonative concentration of the novel antiozonant herein set forth.

The present invention is utilized for the stabilization of any rubber subject to cracking due to ozone and is particularly applicable to the stabilization of synthetic rubber. Most of the synthetic rubber now being produced commercially is GR-S rubber which is a copolymer of butadiene and styrene. Other synthetic rubbers include those produced from butadiene and acrylonitrile (Buna-N), butadiene and isobutylene (Butyl rubber), etc. Still other synthetic rubbers include Thiokol rubber, silicone rubber, neoprene rubber, etc.

The present invention also is used for the stabilization of natural rubber. Natural rubber is regarded as comprising naturally occurring isoprene polymers. The natural rubbers include Hevea rubber, cauotchouc, balata, gutta percha, etc.

In accordance with the present invention, rubber is stabilized against cracking due to ozone by incorporating therein an N-sec-alkyl-p-aminophenol in which the alkyl group contains from 7 to 12 carbon atoms. For the reasons to be hereinafter set forth and illustrated in the accompanying examples, it is an important and essential feature of the present invention that the p-aminophenol possesses the critical configuration herein set forth. It is necessary that the alkyl substituted be a secondary alkyl substituted because, as will be shown in the examples, compounds containing this configuration possess considerably better antiozonant properties than those having a primary substituent. Similarly, it is important that the antiozonant contains at least 7 carbon atoms in the alkyl group because alkyl groups of a lower number of carbon atoms are toxic and therefore undesirable for use in areas habitated by man. Furthermore, the compounds containing a lower alkyl group may be of too high volatility and therefore would be lost from the rubber during the long periods of high temperature encountered in the use of the rubber or in the manufacturing process. Still further compounds containing a lower alkyl group would be less soluble in the rubber hydrocarbon and more soluble in water so that the compound would be lost during washing of the rubber or upon contact thereof with water. On the other hand, the antiozonant should not contain an alkyl substituent of more than 12 carbon atoms because higher alkyl substituents tend to decrease the potency of the antiozonant. Furthermore, the higher alkyl substituent produces a compound which will be retained within the internal structure of the rubber and will not migrate to the surface where it can serve to counteract the deleterious effect of ozone.

As hereinbefore set forth, the antiozonant of the present invention comprises an N-sec-alkyl-p-aminophenol in which the sec-alkyl group contains from 7 to 12 carbon atoms. Illustrative antiozonants include N-sec-heptyl-p-aminophenol, N-sec-octyl-p-aminophenol, N-sec-nonyl-p-aminophenol, N-sec-decyl-p-aminophenol, N-sec-undecyl-p-aminophenol, and N-sec-dodecyl-p-aminophenol.

Specific preferred compounds include N-2-heptyl-p-aminophenol, N-2-octyl-p-aminophenol, N-2-nonyl - p - aminophenol, N-2-decyl-p-aminophenol, N-2-undecyl-p-aminophenol, and N-2-dodecyl-p-aminophenol.

In general, it is preferred that the alkyl group be substantially straight chain. However, in some cases the alkyl group may contain mild branching in the chain as, for example, in such compounds as N-2-(5-methyl hexyl)-p-aminophenol, N-2-(5-methyl heptyl)-p-aminophenol, N-2-(6-methyl octyl)-p-aminophenol, N-2-(6-methyl nonyl)-p-aminophenol, N-2-(7-methyl decyl)-p-aminophenol, and N-2-(8-methyl undecyl)-p-aminophenol. N - 3 - (5 - methyl hexyl) - p - aminophenol, N-3-(5-methyl heptyl)-p-aminophenol, N-3-(5-methyl octyl)-p-aminophenol, N-3-(6-methyl nonyl)-p-aminophenol, N-3-(7-methyl decyl)-p-aminophenol, and N-3-(7-methyl undecyl)-p-aminophenol.

The antiozonant of the present invention may be prepared in any suitable manner. A preferred method comprises the reductive alkylation of p-aminophenol with a suitable ketone. A preferred catalyst for effecting the reaction comprises a mixture of the oxides of chromium, copper and barium although other suitable catalysts may be employed. Other catalysts include those containing cobalt, nickel, platinum, palladium, molybdenum, etc. In general the reaction is effected at an elevated temperature which may range from about 50° to about 250° C. and a hydrogen pressure of from about 3 to about 200 atmospheres.

As specific examples of the preparation of antiozonants for use in accordance with the present invention, N-2-sec-octyl-p-aminophenol is prepared by the reductive alkylation of p-aminophenol with methyl hexyl ketone. N-3-(5-methyl heptyl)-p-aminophenol is prepared by the reductive alkylation of p-aminophenol with ethyl 2-methylbutyl ketone. It is understood that other suitable antiozonants may be prepared in the same general manner except using the specific ketone required to give the desired final compound.

It is understood that a mixture of two or more antiozonant compounds meeting the critical limitations herein set forth may be employed. Preferably these are selected from the antiozonant compounds specifically set forth hereinbefore.

The antiozonant of the present invention is utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozonant of the present invention can be used in reclaims and lattices of rubbery materials, whether or not admixed with fillers, pigments, accelerating agents, etc. In another embodiment the present invention can be utilized for the stabilization of adhesives, elastomers, etc. which tend to crack due to ozone.

The antiozonant is utilized in a small but sufficient concentration to retard ozone cracking. In general, this antiozonative concentration will be within the range of from about 0.25% to about 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozonant of the present invention is utilizable along with other additives incorporated in rubber for specific purposes including, for example, antioxidants, accelerators, softeners, extenders, wax, reinforcing agents, etc. In some cases the antiozonant of the present invention may be used in admixture with other antiozonants as, for example, N,N'-dioctyl-p-phenylene diamine.

The antiozonant of the present invention normally is employed along with certain commercial antioxidants which are incorporated in the latex prior to milling with the other components of the rubber. In this embodiment, the antiozonant of the present invention thus is used along with a separate antioxidant. Any suitable antioxidant may be employed including, for example, phenyl-beta-naphthylamine, 6-phenyl-2,2,4-trimethyl-1,2-dihydroquinoline, marketed under the trade name of "Santoflex-B," 2,2'-methylene-bis-(4-methyl-6-tert-butylphenol), 2,6-ditert-butyl-p-cresol, the reaction product of acetone and diphenylamine, marketed under the trade name of "B.L.E.," etc. These antioxidants, generally are used in a concentration of from about 0.5% to about 3% by weight of the rubber.

The antiozonant of the present invention also normally is employed along with paraffin and/or microcrystalline wax. The wax generally is utilized in a concentration of from about 0.5% to about 3% by weight of the rubber.

In one embodiment, the antiozonant of the present invention is admixed with the antioxidant and/or wax, and the mixture then is composited with one or more of the other components of the rubber composition.

The antiozonant of the present invention is incorporated in rubber or rubbery products in any suitable manner and at any suitable stage of preparation, preferably prior to milling and vulcanization of the rubber composition. When the antiozonant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

*Example I*

N-2-octyl-p-aminophenol was prepared by the reductive alkylation of p-aminophenol with methyl hexyl ketone. The product had a melting point of 94–5° C. and a boiling point of 120–54° C. at a pressure of 0.3 mm. of mercury.

The data reported in this example were obtained from a sample of GR–S black rubber stock being manufactured by one of the rubber companies and marketed for commercial use. The rubber was cut into strips. In the sample containing additive, the additive was incorporated by immersing and swelling the sample in a solution containing the additive and toluene as a solvent. The concentration of additive was selected to leave in the rubber sample, after the toluene had been removed, a concentration of additive of about 2 parts by weight per 100 parts by weight of rubber hydrocarbon. After evaporation of the toluene, the sample was cooled, elongated 20% and mounted on a waxed wooden panel, along with a control sample of the rubber (sample not containing the additive). The samples then were exposed in an ozone cabinet to air containing about 54 parts of ozone per 100 million parts of air at a temperature of about 100° F.

The sample rubber containing about 2 parts by weight of N-2-octyl-p-aminophenol did not show ozone cracks until after about 120 hours exposure in the manner hereinbefore described. On the other hand, the control sample of rubber (not containing this additive) began to show visible cracks within 4½ hours after exposure in the ozone cabinet.

From the above data it will be noted that the antiozonant of the present invention was very effective in retarding cracking of the rubber. It will be noted that this antiozonant meets the limitations set forth hereinbefore in that it contains a secondary alkyl group and that the secondary alkyl group contains 8 carbon atoms.

*Example II*

The antiozonant used in this example is N-(1-methyl hexyl)-p-aminophenol. When incorporated in another sample of the rubber and in the same manner as described in Example I, the rubber containing about 2% by weight of N-(1-methyl hexyl)-p-aminophenol did not show visible cracks until after about 120 hours exposure in the ozone cabinet. Here, again, it will be noted that the antiozonant served to effectively retard cracking in comparison to the visible cracks appearing in the control sample of the rubber within 4½ hours.

It will be noted that the antiozonant of this example contains a secondary alkyl group and that the alkyl group contains 7 carbon atoms and, accordingly, meets the critical requirements hereinbefore set forth.

*Example III*

As hereinbefore set forth, it is essential that the antiozonant contains a secondary alkyl group in order to obtain the improved results of the present invention. This is illustrated by comparing Example II with the present example. In the present example the compound used is N-heptyl-p-aminophenol and was prepared by the reductive alkylation of p-aminophenol with heptaldehyde.

When incorporated in a concentration of about 2 parts by weight in another sample of the rubber and in the manner described in Example I, the sample of rubber containing this additive showed visible cracks after about 59 hours of exposure in the ozone cabinet.

In contrast it will be noted that the antiozonant of Example II (also containing 7 carbon atoms in the alkyl group but the alkyl group being of secondary configuration) served to retard cracking for about 120 hours, which is substantially double the effect obtained with the additive having a primary alkyl configuration.

*Example IV*

This example reports the results of using an additive comprising N-(2-ethyl hexyl)-p-aminophenol. It will be noted that this additive contains 8 carbon atoms in the alkyl group but that the attachment to the nitrogen atom is of primary configuration. After incorporation in another sample of the rubber and in the same manner as described in Example I, the sample of rubber containing this additive showed visible cracks after about 39 hours exposure in the ozone cabinet.

The above results are to be compared with the result reported in Example I. Both of these additives contained 8 carbon atoms in the alkyl group. However, the additive containing the secondary alkyl configuration retarded cracking for about 120 hours, whereas the additive containing a primary alkyl configuration retarded cracking for only about 39 hours, the former thus showing an increase of about three times over and above that obtained with the latter additive.

*Example V*

This example illustrates the undesired result obtained when the additive contains an alkyl group having more than 12 carbon atoms. The additive used in this example is N-(1-methyl dodecyl)-p-aminophenol which, it will be noted, contains 13 carbons in the alkyl group.

About 2 parts by weight of this additive were incorporated in another sample of the rubber and in the same manner as described in Example I. This sample of rubber showed visible cracks after about 15 hours of exposure in the ozone cabinet. Thus, it is important that the additive does not contain more than 12 carbon atoms in the alkyl group because larger alkyl groups appear to reduce the potency of the additive and also are objectionable for the other reasons hereinbefore set forth.

We claim as our invention:

1. A rubber normally subject to cracking due to ozone containing from about 0.25% to about 10% by weight of an N-sec-alkyl-p-aminophenol antiozonant in which the sec-alkyl group contains from 7 to 12 carbon atoms.

2. The composition of claim 1 is further characterized in that said rubber is selected from the group consisting of natural and diene synthetic rubbers.

3. The composition of claim 1 is further characterized in that said rubber is natural rubber.

4. Diene synthetic rubber normally subject to cracking due to ozone containing from about 0.25% to about 10% by weight of N-2-heptyl-p-aminophenol.

5. Diene synthetic rubber normally subject to cracking due to ozone containing from about 0.25% to about 10% by weight of N-2-octyl-p-aminophenol.

6. Diene synthetic rubber normally subject to cracking due to ozone containing from about 0.25% to about 10% by weight of N-2-nonyl-p-aminophenol.

7. Diene synthetic rubber normally subject to cracking due to ozone containing from about 0.25% to about 10% by weight of N-2-decyl-p-aminophenol.

8. Diene synthetic rubber normally subject to cracking due to ozone containing from about 0.25% to about 10% by weight of N-2-undecyl-p-aminophenol.

References Cited in the file of this patent

UNITED STATES PATENTS

| | | |
|---|---|---|
| 2,220,065 | Clarkson | Nov. 5, 1940 |
| 2,576,458 | Hill et al. | Nov. 27, 1951 |
| 2,657,983 | Hill et al. | Nov. 3, 1953 |
| 2,692,287 | Bell et al. | Oct. 19, 1954 |
| 2,729,690 | Oldenburg | Jan. 3, 1956 |
| 2,729,691 | De Pree | Jan. 3, 1956 |

OTHER REFERENCES

"Natural and Synthetic High Polymers," Meyer; High Polymer, Series, vol. IV; Interscience Pub. Co., Inc., New York (1942), pages 146–148.